United States Patent Office 3,422,612
Patented Jan. 21, 1969

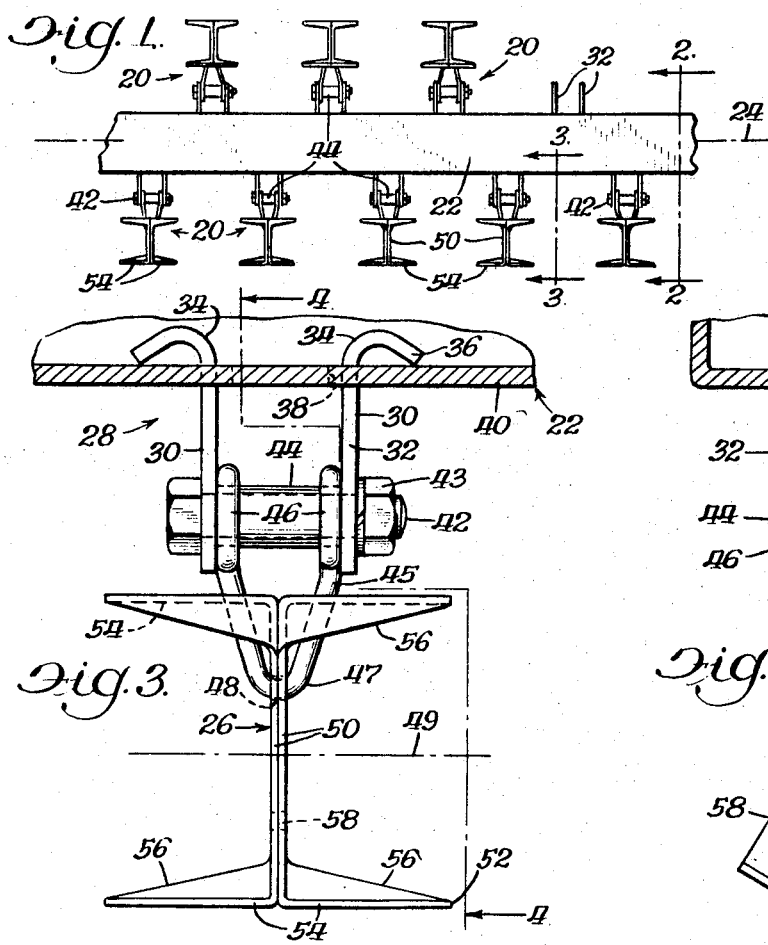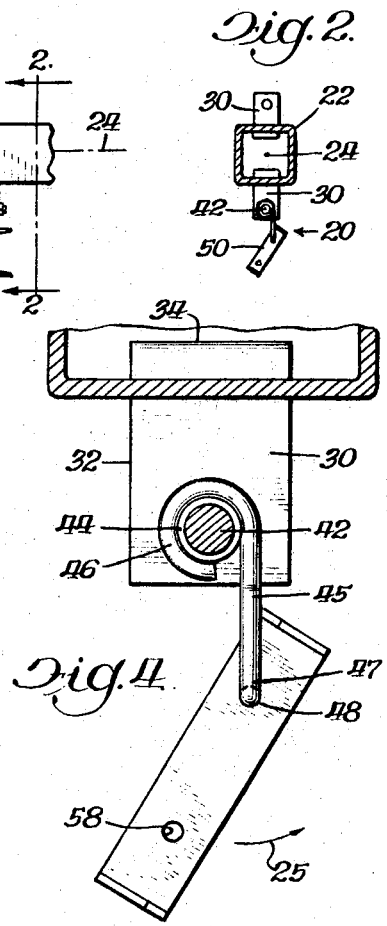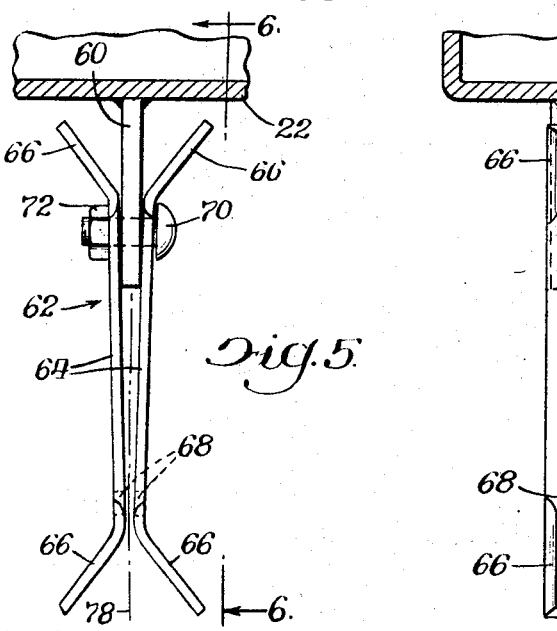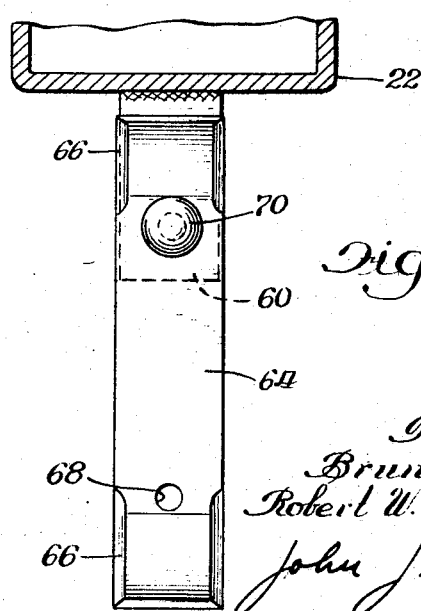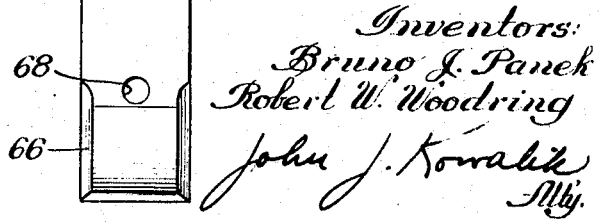

3,422,612
FLAIL KNIFE ASSEMBLY
Bruno J. Panek, Chicago, and Robert W. Woodring, La Grange, Ill., assignors to International Harvester Company, Chicago, Ill., a corporation of New Jersey
Filed July 21, 1965, Ser. No. 473,659
U.S. Cl. 56—294     10 Claims
Int. Cl. A01d 55/18

ABSTRACT OF THE DISCLOSURE

A flail knife assembly for securement to a rotatable holder comprising a pair of knives each having a shank and a cutting portion at each end bent in the same direction away from the shank, each portion having front and rear cutting edges and mounting apertures in the shank portion adjacent each cutting portion so that the knives are reversible end for end.

---

The present invention relates to a flail knife assembly and more particularly such an assembly for use in mowers and other similar forage choppers and harvesters.

The invention has to do with that kind of mower having an elongated knife holder extending transverse to the direction of movement of the mower and rotatable on its central longitudinal axis. The knife assemblies are mounted on the holder, the knives being pivoted adjacent one end and upon rotation of the holder the outer ends of the knives fly out to generally radial position.

In the normal use of such a mower the knives become dulled and nicked and require periodic resharpening, and the total time and effort required for resharpening such knives in any given operation is considerable and detracts from the efficiency of the mowing operation.

A broad object of the present invention is to provide a novel knife assembly having knives with a plurality of cutting edges and arranged so that they can be reversed for presenting the different edges in cutting position in the mower whereby to eliminate the necessity for re-sharpening as often as has been heretofore done.

A further object is to provide a flail knife assembly of extremely simple construction facilitating mounting the knives and reversing them for presenting other cutting edges in cutting position.

Still another object is to provide a knife assembly having knives with cutting edges at both ends and enabling reversing the knives in end-for-end manner.

Still another object is to provide a knife assembly of the foregoing character in which each knife has four cutting edges, and in which the knives can be reversed universally i.e., end-for-end about a transverse axis and also side-for-side about a longitudinal axis.

An additional object is to provide a knife assembly of the foregoing general character in which each knife has a shank or mounting portion and a cutting portion at each end of the mounting portion, and wherein the knives are provided with apertures for receiving mounting elements, the knives including a novel construction in which the apertures are disposed in the mounting portions, to the exclusion of the cutting portions, whereby to eliminate depletion of the material of the cutting portions and consequent weakening thereof, as contrasted with providing the apertures in the cutting portions and detracting from the extent that the cutting portions may be sharpened, in view of the reduction of the material of the cutting portions due to the sharpening operations.

Other objects and advantages of the invention will appear from the following detailed description taken in conjunction with accompanying drawings in which:

FIGURE 1 is a small scale view of a portion of a knife holder having several of the knife assemblies of the present invention mounted thereon;

FIGURE 2 is a view from the left of FIGURE 1, as indicated by the line 2—2;

FIGURE 3 is a large scale sectional view taken at line 3—3 of FIGURE 2 and thus oriented according to FIGURE 1;

FIGURE 4 is a view taken at line 4—4 of FIGURE 3;

FIGURE 5 is a view of a second embodiment of the invention, oriented according to FIGURE 3; and FIGURE 6 is a view taken at line 6—6 of FIGURE 5.

Referring now in detail to the drawings, attention is directed first to FIGURES 1 and 2 showing a plurality of knife assemblies embodying the features of the present invention, and the holder on which the assemblies are mounted. The knife assembly is indicated in its entirety at 20 and is mounted on a holder 22 in the form of a shaft which may be of any suitable shape in cross section, such as square in the present instance, and is preferably tubular. The shaft 22 is mounted in the mower transverse to the direction of travel of the mower and rotates about its own central longitudinal axis indicated by the dot-dash line 24, and in the direction indicated by the arrow 25.

The details of construction of the knife assembly 20 are shown in FIGURES 3 and 4. The knife assembly includes a pair of knives or blades 26 supported by mounting means indicated at 28. In so far as the knives 26 of the present invention are concerned, the mounting means 28 may be of any of various kinds and in the present instance is similar to the mounting means disclosed and claimed in our copending application Ser. No. 473,661, filed July 21, 1965, (Docket D–8423, filed concurrently herewith) and now U.S. Patent 3,402,541 issued Sept. 24, 1968. Such mounting means includes a pair of clips 30 which may be the same or similar in construction and preferably are of substantial width as shown in FIGURE 4. Each clip includes a long leg portion 32 and an arcuate or bowed portion 34 the latter being of less linear extent than the leg portion 32 and terminating in an extension 36. The clips are mounted in position by inserting the terminal portions 36 through apertures 38 in the wall element 40 of the holder 22. The outer extended ends of the leg portions 32 have apertures receiving a bolt 42 provided with a nut 43 thereon, which in addition to directly supporting the knives 26 as described hereinbelow, draws the clips toward each other to provide a firm and rigid mounting of the clips in the holder 22 as described in detail in our copending application referred to above. A sleeve 44 surrounds the bolt for limiting the movement of the clips toward each other.

A U-shaped link 45 is mounted on the bolt 42, having eyelets 46 receiving the bolt, the central loop portion 47 of the link being fitted in aligned apertures 48 of the knives. The knives are symmetrical about a transverse axis indicated by the dot-dash line 49, which when the knives are mounted, is parallel with the axis 24 of rotation of the holder 22. Each knife includes a central mounting portion 50 and a cutting portion 52 at each end, both cutting portions extending transversely outwardly from the mounting portion in the same direction. Each of these cutting portions has a cutting edge 54, and a trailing edge 56 inclined from the outer end of the cutting edge to the mounting portion 50. The knives are mounted with the cutting edges in leading position relative to the rotation of the holder 22.

Each of the knives 26 has an aperture 48 adjacent each end of the mounting portion 50. The mounting portions are of planar shape and when the two knives are fitted together in back-to-back relation as shown, the apertures at the two ends are in register, and those at one end of the knives are fitted on the link 45 in the mounting means in the manner stated. Upon rotation of the holder 22 on its longitudinal axis, the knives fly out toward radial position.

In the present instance when the cutting edges 54 on the two knives, at their outer ends and in cutting position, become dulled, the knives may be repositioned 180° from their shown position about the transverse axis 49, for presenting the other cutting edges in cutting position, i.e., those theretofore at the radially inner ends. Thus the knives provide double cutting effect and need not be re-sharpened as each cutting edge becomes dulled.

The provision of the apertures 48 in the mounting portions 50 of the knives provides a minimum of weakening of the knives as contrasted with having apertures in the cutting portions. In the latter case, the apertures add to the already-weakening effect of the sharpening operation. The two knives in the assembly need not be positively connected together, thereby enabling one of them for example to yield on encountering an obstacle while the other need not so yield.

The central portion or bight 47 of the U-shaped link 45 extends tangentially of the bolt 42 and the knives 26 depend at an angle to the radial, the inner cutting portions 52 of the knives bearing against the U-shaped link 45 and thus retaining the knives at the angle mentioned. In the rotation of the holder, in the direction indicated by the arrow 25 as referred to above, if the knives should encounter an obstacle in the use thereof they are enabled to yield about the axis of their mounting on the U-shaped link 45, in clockwise direction as viewed in FIGURE 4. This positioning of the knives presents the cutting portions 52 at the radially outer ends of the knives at an angle to the path of rotation, thereby providing a self-cleaning feature, and producing an air stream, as described and claimed in our copending application referred to above.

The embodiment of the invention shown in FIGURES 5 and 6 includes knives that are universally reversible, each knife including four cutting edges, and the two knives together being reversible both end-for-end about a transverse axis, and side-for-side about a longitudinal axis. In this instance the holder 22 is provided with an ear or lug 60 for each pair of knives 62. The ear 60 may be merely in the form of a lug or straight piece of material welded to the holder 22 and provided with a transverse aperture.

Each knife 62 includes a central mounting portion or shank 64 generally in the form of a plane, and two cutting portions 66, one at each end of the mounting portion 64. The cutting portions 66 are bent at an angle to the mounting portion 64 about transverse lines, both extending from the same side of the mounting portion.

The mounting portion 64 is provided with an aperture 68 adjacent each end thereof. The apertures 68 in the two knives are in register when the knives are fitted in back-to-back position shown. In mounting the knives on the ear 60, they are positioned on opposite sides of the ear in back-to-back relation and a bolt 70 is fitted through the apertures 68 and the aperture in the ear, a nut 72 being threaded on the bolt.

Each cutting portion 66 is provided with a cutting edge 74 on each of opposite marginal edges, each knife therefore having four cutting edges, two at each end. The proportions and dimensions of the various elements are such that when the knives are mounted on the ear 60 the inner cutting portions 162 are of course clear of the holder 22. Upon rotation of the holder, the knives fly out as described in connection with the previous embodiment and in this case also the two knives are free of positive connection together.

Because of the mirror image symmetry of the knives in all directions, they are universally reversible. For example they are together reversible about an axis extending transverse to the knives as indicated by the dot-dash line 76 and they are also reversible about an axis longitudinally of the knives and lying therebetween as indicated by the dot-dash line 78. Thus when the cutting edges that are in cutting position become dulled, the two knives together may be repositioned 180° about the axis 78 to present the opposite cutting edges, but at the same ends of the knives, in cutting position. When these latter edges become dulled the knives are repositioned 180° about the transverse axis 76, presenting third cutting edges in cutting position, and when these latter edges become dulled, the knives are again repositioned 180° about the axis 78.

In the present instance as in the embodiment of FIGURES 3 and 14 the mounting apertures 68 are in the mounting portions 64, as contrasted with being in the cutting portions 66. Thus as the cutting portions are reduced in size and mass due to repeated sharpening operations, the mounting portions 64 remain of full size and strength without any deteriorating effect, and without diminishing the effectiveness of the mounting portions.

While we have disclosed and claimed certain herein preferred embodiments of the invention it will be understood that changes may be made therein within the spirit and scope of the appended claims.

We claim:
1. A flail knife assembly adapted for securement to a holder rotatable on a longitudinal axis and having radial monuting means thereon, comprising, a pair of knives each having an intermediate mounting portion and a cutting portion at each end, the cutting portions extending laterally from the same side of the mounting portion, the mounting portion having an aperture therein adjacent each end, the knives being adapted for mounting in back-to-back relation and when so relatively positioned the corresponding apertures being in alignment, the cutting portions having leading edges which when the knives are relatively positioned as stated, form a substantially continuous cutting edge extending generally perpendicular to the mounting portions, and the knives together being reversible end-for-end on the mounting means and when in either of such positions present the corresponding cutting edges in cutting position at outer end of the knives relative to the holder.

2. A flail knife assembly adapted for securement to a holder rotatable on a longitudinal axis, comprising, mounting means on the holder extending generally radially thereof, a pair of knives, each knife having an intermediate mounting portion and a cutting portion at each end thereof, both cutting portions extending laterally from the same side of the mounting portion, the mounting portion and the cutting portions each lying substantially in a plane, and the planes of the cutting portions being substantially perpendicular to the plane of the mounting portion, each mounting portion having an aperture adjacent each end, the knives being adapted to be positioned in back-to-back position, and when in such position the respective apertures being in alignment, aligned apertures receiving an element of said mounting means for swinging movement of the knives about an axis parallel with said axis of the holder, said apertures lying substantially in a central longitudinal line in the mounting portions, said element in the mounting means and the cutting portions of the knives being so dimensioned and positioned that the knives are retained at an angle to the radius of the holder whereby the cutting portions at the outer end of the knives are inclined at an angle to the line of movement thereof thereby developing an air stream, said knives being reversible end-for-end about a transverse axis therethrough.

3. A flail knife assembly adapted for securement to a holder rotatable on a longitudinal axis and having radial mounting means thereon, comprising, a pair of knives each in the form generally of a flat strip bent on transverse lines forming an intermediate mounting portion and a cutting portion at each end, the cutting portions extending laterally from the same side of the mounting portion, each mounting portion having an aperture therein adjacent each end thereof but spaced from the corresponding cutting portion, the knives being adapted for mounting in back-to-back position and when in such position the corresponding apertures being in alignment, the knives being mountable selectively on an element of said mounting means received in the aperture at either end of the knives for swinging movement of the knives about said element on an axis parallel with the axis of rotation of the holder, each cutting portion of each knife having a cutting edge thereon.

4. The invention set out in claim 3 wherein each cutting portion has a cutting edge on each lateral edge, each knife thereby having four cutting edges.

5. The invention set out in claim 4 wherein the knife is symmetrical about a central transverse axis.

6. A flail knife having a portion at each end bent at an angle to the remainder of the knife, each of said portions having a cutting edge, and the knife having a pivot aperture adjacent each end of said remainder for alternate pivotal mounting of the knife on mounting means.

7. A swinging flail knife including an intermediate mounting portion and a cutting portion at each end, the cutting portions extending substantially perpendicular to the mounting portion and laterally from the same side of the mounting portion, and the mounting portion having an alternate mounting pivot aperture adjacent each end.

8. A flail knife in the form of a generally flat strip bent on transverse lines having an intermediate mounting portion and a cutting portion at each end thereof, the cutting portions being positioned substantially perpendicular to the mounting portion, the mounting portion having a pivot aperture adjacent each end thereof for alternately receiving an element therein of a mounting means, each cutting portion having a cutting edge generally perpendicular to the mounting portion and a trailing edge inclined to said cutting edge, the cutting portions being symmetrical about a central transverse axis through the mounting portion whereby when the knife is pivoted at either end, the cutting edge at the outer end of the knife is presented in the same direction.

9. A flail knife having an intermediate mounting portion and a cutting portion at each end inclined to the mounting portion, the cutting portions extending laterally from the same side of the mounting portion and diverging outwardly relative to each other, the mounting portion having alternate pivot mounting apertures at the ends thereof for swinging mounting of the knife on an associated support, and each cutting portion having a cutting edge.

10. A flail knife having an intermediate mounting portion and a cutting portion at each end of the mounting portion bent at an angle to the mounting portion, the mounting portion having a mounting pivot aperture adjacent each end thereof for alternate pivotal mounting of the knife on a support, and each cutting portion having a cutting edge on each lateral edge thereof.

References Cited

UNITED STATES PATENTS

| | | |
|---|---|---|
| 2,706,441 | 4/1955 | Caldwell et al. |
| 2,941,347 | 6/1960 | Strom. |
| 3,099,121 | 7/1963 | McCollum _____ 56—121.44 |
| 3,177,640 | 4/1965 | Mott _____ 56—294 |

ANTONIO F. GUIDA, *Primary Examiner.*